Patented Feb. 26, 1935

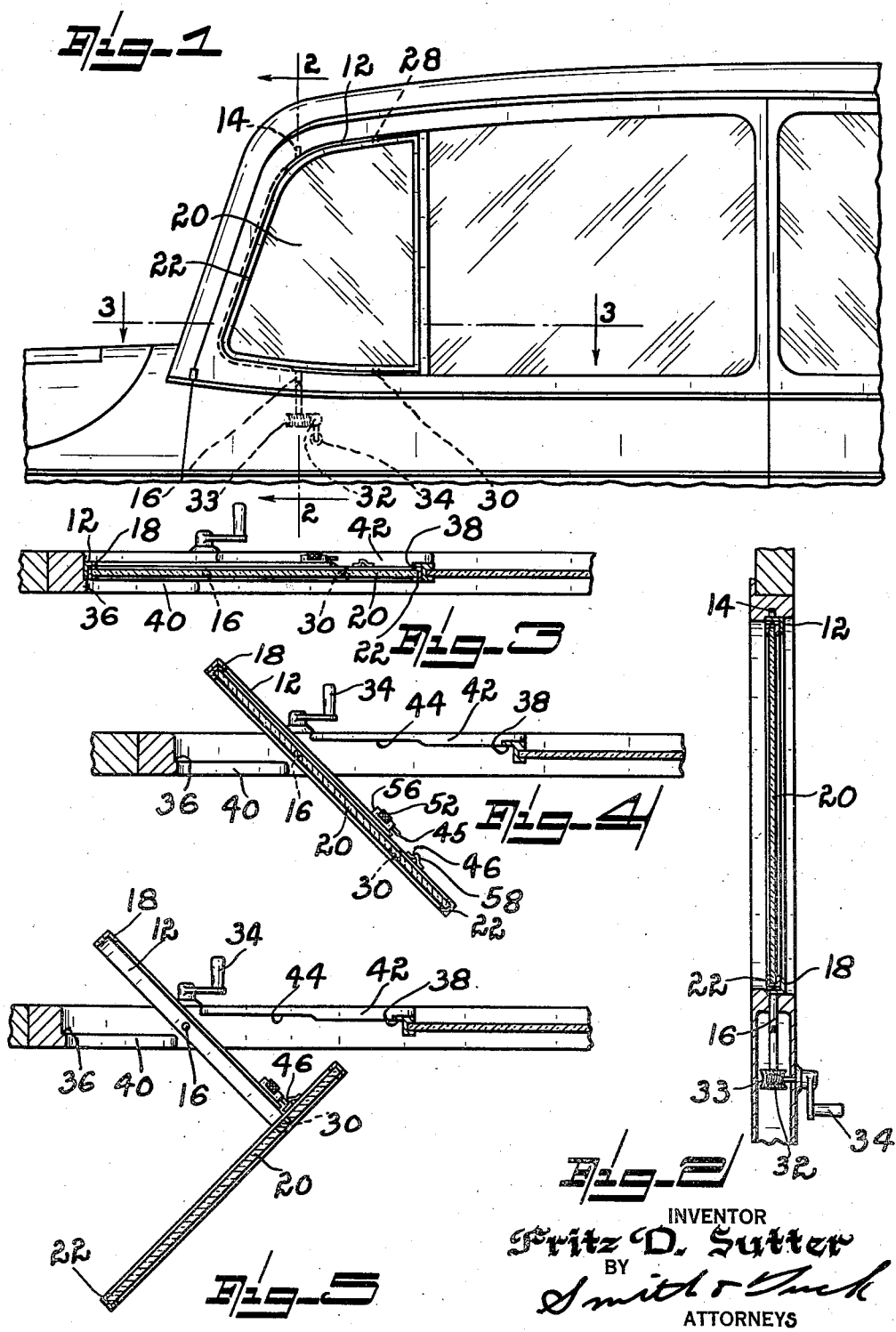

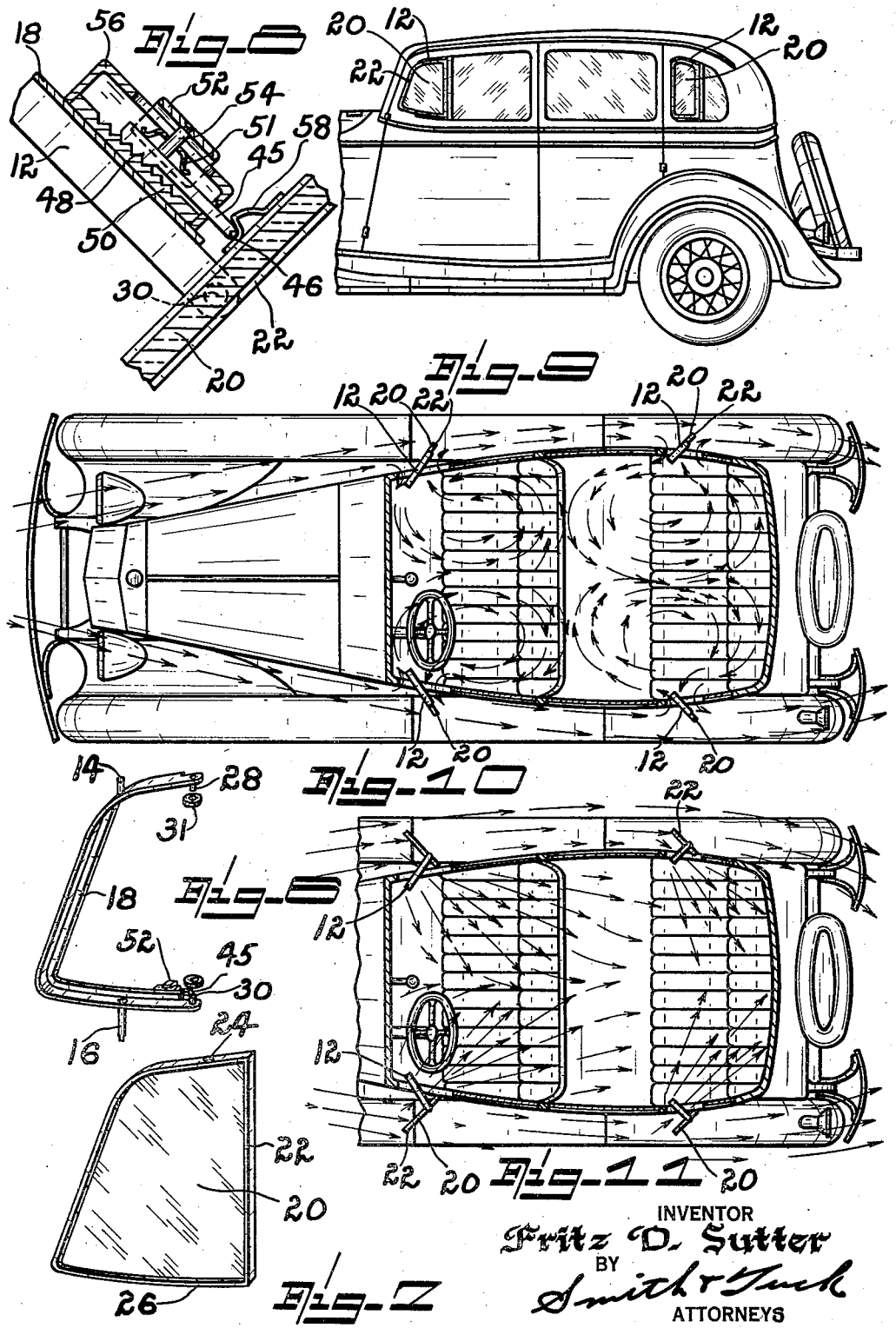

1,992,584

UNITED STATES PATENT OFFICE 1,992,584

VENTILATING MEANS FOR INCLOSED AUTOMOBILE BODIES

Fritz D. Sutter, Seattle, Wash.

Application November 22, 1933, Serial No. 699,246

4 Claims. (Cl. 296—44)

This invention relates to the automotive art and more particularly to a ventilating means for inclosed automobile body.

Considerable development has been made in the providing of ventilation control of closed cars by having a portion of the enclosing glass windows pivotally mounted upon a substantially vertical axis. The present development provides a degree of ventilation that can be easily controlled. However, inasmuch as the pivoted member operates in conjunction with a weather tight closure, it has been found difficult to get the degree of air circulation that is so desirable under certain conditions. This is occasioned by virtue of the fact that the pivoted glass member must be so arranged as to definitely abut fixed stops which in turn limit the amount of movement about the vertical axis. In my present invention I employ a form of control which is in common use whereby a frame is controlled, this frame normally having the glass fixedly secured to it. In my improvement, however, I provide that the glass itself will be encased in a secondary frame which is pivotable in the controlled frame.

The principal object of my present invention, therefore, is to provide a controlled ventilator for closed cars which will permit of greater latitude in the movement of the enclosing glass and permit it to be placed at such an angle and at such a distance beyond the car body, that the maximum amount of air may be deflected into the car body.

Other and more specific objects will be apparent from the following description taken in connection with the accompanying drawings, wherein Figure 1 is a fragmentary side elevation of an automobile body employing my ventilating means. Figure 2 is a cross sectional view taken along the line 2—2 of Figure 1. Figures 3, 4 and 5 illustrate different positions of my ventilating means. Figure 6 is a perspective view showing the resilient or spring frame used with my device. Figure 7 is a perspective view illustrating the frame with the glass it encloses such as used with my present ventilating means. Figure 8 is a fragmentary view of adjustable stop means for regulating the position of my ventilating means. Figure 9 is a side elevation of a conventional automobile showing the position of my ventilating means. Figure 10 illustrates the draft or ventilation circulation as it would occur with my device in the position indicated at Figure 4. Figure 11 illustrates the circulation of air when my device is used in the position shown in Figure 5.

Referring to the drawings, throughout which like reference characters indicate like parts, 12 designates the main frame of my device. This is constructed along more or less conventional lines for this type of equipment and has the aligned pivot members 14 and 16. The frame itself is made, preferably, of spring material of substantially angle section, in that it has a flange as 18 extending entirely around the inner margin of the frame. This serves a two-fold purpose, one, that of stiffening the frame against distortion and secondly providing a definite stop for the window member 20. The window 20 should preferably be provided with an enclosing metal frame 22 and should of course have a forward margin which will match the leading edge of frame 12. In the form illustrated I have provided aligned pivots at 24 and 26. These pivots are adapted to engage pins as 28 and 30 which are fixedly secured within frame 12. It has been found desirable to provide spring washers as 31 to effect the proper tensioning of frame 12 upon the window or deflector 20.

Frame 12 acts in much the same manner as the present deflector used and may be controlled in any suitable manner as by means of the worm 32 and gear 33 illustrated in Figure 2.

Following present practice, hand crank 34 may be used to operate and control the angularity of frame 12 with respect to the car body.

The operation of my present device will probably best be understood by referring to Figures 3, 4 and 5. In Figure 3 the frame and window are aligned in their normal closed position in which the frame 12 is abutting the stop 36 and frame 22, which must be arranged to clear stop 36, has its rear margin abutting stop 38 thus providing a weather tight joint. The upper and lower margins of frame 12 abut oppositely disposed stop members 40 and 42. Stop 42 is cut away or relieved at 44 so that flange 18 of frame 12 may fit snugly against the stop at the same time that the window frame 22 abut stop 42.

The stops 40 and 42 which are very desirable if weather tight windows are to be provided, are a limiting factor in the positioning of frame 12 and it is because of this limitation that I have provided my present improvement wherein window 20 may be revolved about pivots 28 and 30 until it assumes a position as indicated in Figure 5. Here the adjustable stop 45 abuts the window frame at 46 and arrests further movement.

Stop 45, as indicated, is formed of a piece of bar material upon which a plurality of teeth are formed at 48. The teeth are disposed to engage similar teeth in piece 50 which in turn is fixedly secured to flange 18 of frame 12. The shape of these teeth is of some importance in that it has been found most desirable to have them shaped so that if undue pressure is applied longitudinally to stop 45 they can rise out of engagement and slip with respect to the teeth in piece 50, they being normally urged into engagement by the compression spring 51. Manual control of the positioning of stop 45 is effected by the hand grip 52 which is connected to stop 45 by means of the post 54, it being necessary to provide a slot in housing number 56 to accommodate the full movement of stop 45. It has further been found desirable to have an abutment as 58 secured to frame 22 so that engagement will be positive even tho the angle between frames 12 and 22 be considerably less than the right angle as shown in Figure 8.

In operation it will be normal that window 20 will be positioned in its desired angular relationship to frame 12 by simply pressing one margin outwardly with the hand. When the proper position has been obtained it is then necessary only to move stop 45 up into engagement with abutment 58 and wind pressure can not vary the desired position.

This arrangement makes it possible to have any reasonably desired angle in the setting of the deflector 20 and this can be changed, aside from the pivoting action about 28 and 30, by swinging the whole frame 12 under control of handle 34 and thus in turn change the angularity of the deflector 20 with respect to the car making for a very convenient control means.

It will be observed from Figure 4 that the normal limited circulation can be had just as in the present type of this form of ventilation. This is indicated in Figure 10. When, however, it is desirable to have the maximum circulation of air as in hot climates and the like the position shown in Figure 5 gives increased circulation of air as indicated in Figure 11, a condition not normally possible with the present equipment.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention, what I claim as new and desire to secure by Letters Patent is:—

1. The combination with a window frame, of an open frame pivoted therein and means for swinging said frame, a sash frame pivoted in the open frame and having a part projecting therefrom, a slide bolt on the open frame, and a keeper for said bolt on the projecting part of the sashframe, to limit relative movement of the open frame and the sash-frame when in open position.

2. The combination with a window frame, of an open frame pivoted therein and means for swinging said frame, an abutment flange at the inner side of said open frame, a sash frame pivoted in the open frame and having a part projecting therefrom, opposed lateral abutments in the window frame adapted to receive the open frame and the sash frame when the latter are in closed position, and means for limiting relative movement of the frames when the latter are in open position.

3. The combination with a window frame having opposed lateral abutments, of an open frame pivoted in the window frame, an abutment flange at the inner side of the open frame, a sash frame pivoted in the open frame and having a part projecting therefrom, a slide bolt on the open frame, and a keeper for said bolt on the projecting part of the sash frame to limit relative movement of the frames when they are in open position.

4. The combination with a window frame having opposed lateral abutments, of a frame pivoted therein and having a rear open end, an abutment flange at the inner side of the open frame, a sash frame pivoted in the open-end frame and having a part projecting therefrom, a slide bolt on the open frame and a detachable fastener therefor, and a keeper for said bolt on the projecting part of the sash frame to limit relative movement of the frames when they are in open position.

FRITZ D. SUTTER.